United States Patent [19]

Summers

[11] Patent Number: 4,531,768

[45] Date of Patent: Jul. 30, 1985

[54] PIPE COUPLING

[75] Inventor: David P. Summers, Houston, Tex.

[73] Assignee: Forerank, Inc., Houston, Tex.

[21] Appl. No.: 446,167

[22] Filed: Dec. 2, 1982

[51] Int. Cl.[3] .............................................. F16L 21/00
[52] U.S. Cl. .................................... 285/338; 285/423;
285/DIG. 22
[58] Field of Search ................ 285/338, 346, 196, 423,
285/DIG. 22, 260; 138/90; 215/358, 359, 361,
301, 296, 364; 220/234, 238

[56] References Cited

U.S. PATENT DOCUMENTS

| 1,548,570 | 8/1925 | Wuesthoff | 285/338 X |
| 1,657,488 | 1/1928 | Shadden | 285/338 |
| 2,366,067 | 12/1944 | Smith | 285/DIG. 22 X |
| 2,821,413 | 1/1958 | Krapp | 285/374 X |
| 2,889,089 | 6/1959 | Herrick et al. | 285/423 X |
| 3,578,360 | 5/1971 | Eliot | 285/338 X |
| 3,842,790 | 10/1974 | Clark | 215/296 X |
| 4,240,473 | 12/1980 | Leonard | 285/338 X |

FOREIGN PATENT DOCUMENTS

| 1008020 | 5/1952 | France | 285/338 |
| 2269673 | 11/1975 | France | 285/196 |
| 53479 | 1/1967 | German Democratic Rep. | 215/296 |

*Primary Examiner*—Thomas F. Callaghan
*Attorney, Agent, or Firm*—Gunn, Lee & Jackson

[57] ABSTRACT

A pipe coupling apparatus comprising a concentric, relatively telescoping tube is adapted to be inserted into a receptacle. A deformable head at the distal end of the tube is deformable to an enlarged, preselected retention configuration wherein the head engages the inner wall of the receptacle to hold the pipe coupling in a locked position. Relative axial shifting of the tube deforms the head from the locking configuration to a collapsed and elongated configuration wherein the head elongates to facilitate insertion or removal of the coupling from the receptacle.

3 Claims, 6 Drawing Figures

FIG.1
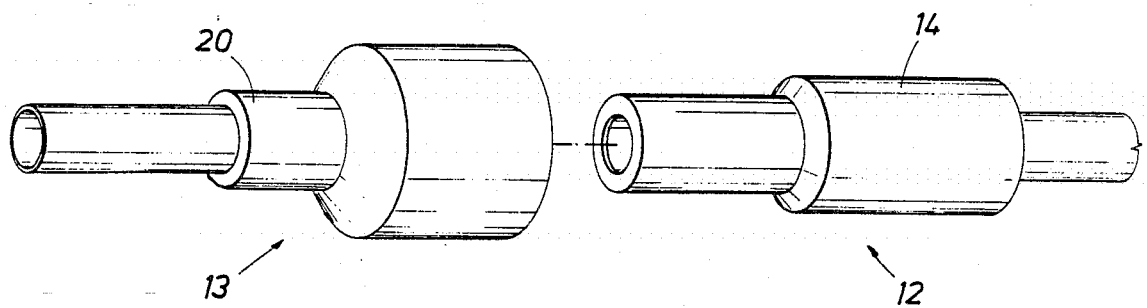
FIG.2
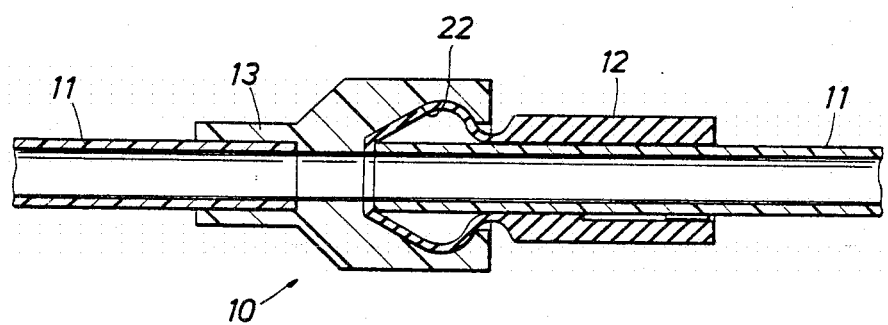
FIG.3
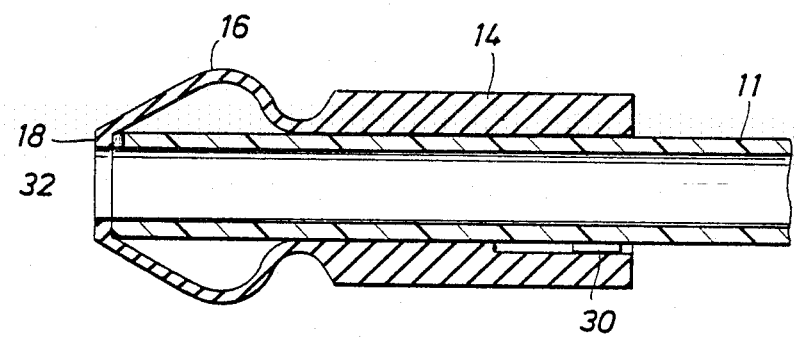
FIG.4
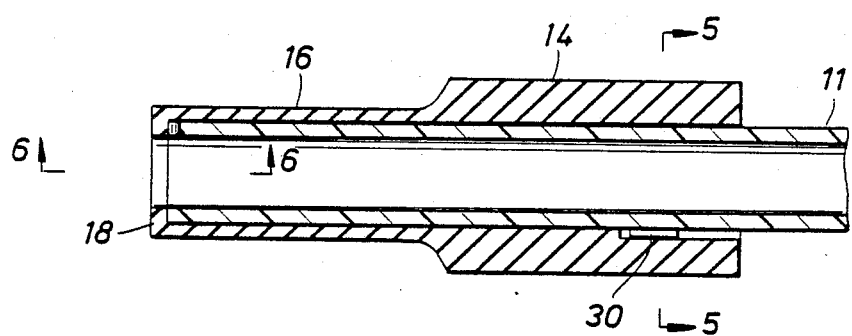
FIG.6
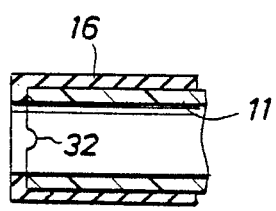
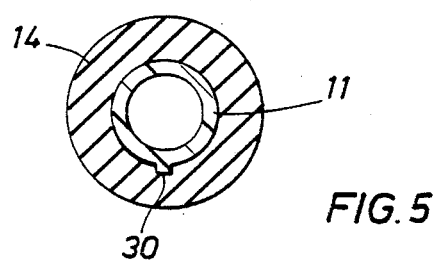
FIG.5

PIPE COUPLING

BACKGROUND OF THE INVENTION

The present invention relates generally to couplings for conduits or pipes, and more particularly to a coupling adapter for nonthreaded plastic pipe or tubing.

The conventional manner of joining pipe, tubing and the like by providing complimentary threaded surfaces is somewhat disadvantageous and tends to be relatively expensive because separate operations are usually required to produce the threaded portions on the tube conduits. Also, the wall thickness of the coupled conduits must generally be sufficient to permit threads to be cut or otherwise formed therein. Alternate permanent joints may be produced by sweating, brazing, welding and the like without the need for threads, but sometimes such joints are undesirable or inconvenient and their joinder may involve expensive equipment to disconnect the joined pipe.

It is the aim of the present invention to provide a novel coupling apparatus employing components which are relatively simple and economical to produce but which nevertheless provide a secure and fluid tight joint and which may be disassembled readily to complete repairs. It is one object of the present invention to provide an improved pipe coupling device.

One feature of the present invention is to provide an improved fluid tight pipe coupling device which may be applied without flaring or threading of the pipe.

SUMMARY OF THE INVENTION

The pipe coupling device of the present invention comprises a first member of generally concentric configuration with an enlarged head and adjacent narrow neck at one end thereof, and a second member of generally concentric configuration with a cavity or receptacle adjacent one end thereof for receiving the flexible head of the first member. The flexible head can be distorted to a reduced diameter flattened for insertion in the receptacle of the second member. The head regains its prior configuration when inserted and locks the two members indefinitely.

BRIEF DESCRIPTION OF THE DRAWINGS

So that the manner in which the above recited features, advantages and objects of the present invention are attatined and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is an exploded perspective view of an improved coupling device and associated pipe, embodying the present invention;

FIG. 2 is a longitudinal sectional view of the assembled coupling device shown applied to a pipe;

FIG. 3 is a sectional view of a tubular coupling member of the invention;

FIG. 4 is a sectional view of the tubular coupling member of the invention shown in the retracted position.

FIG. 5 is a transverse sectional view along the line 5—5; and

FIG. 6 is a sectional view showing a locking tab and notch.

DESCRIPTION OF THE PREFERRED EMBODIMENT

Referring now to the drawing which illustrates a preferred embodiment of the present invention, the reference numeral 10 generally designates the improved coupling device which is illustrated as applied to a pipe 11 which may be a plastic pipe, tubing, conduit or other form of pipe. The coupling device 10 includes a first or insertive coupling member 12 and a second or receptive coupling member 13, the coupling members preferrably being formed of a polymeric material such as polyvinyl chloride or the like of thermoplastic material. A typical size is pipe in the range of 2 inches to 8 inches in diameter. Typical internal pressures are in the range of up to about 100 PSI. The axial or bending loads on the coupled joint are neglible.

The first coupling member 12 is of tubular figuration including a rigid shaft 14 and a flexible head 16. The coupling member 12 has an axial bore extending therethrough. The diameter of the bore through the shaft 14 is slightly less than the outside diameter of the pipe 11. In attaching the coupling member 12 to the pipe 11, the shaft 14 is slid onto the pipe 11 until the end of the pipe 11 abuts against an inwardly extending circumferential lip 18 located at the distal end of the head 16. The lip 18 extends inwardly into the axial bore about the thickness of the pipe 11 providing a peripheral shoulder or abutment with the edge of the pipe.

Turning now to FIG. 4, the coupling member 12 is shown in the retracted position. Upon moving the shaft 14 to the right as shown in FIG. 4, the head 16 is caused to collapse about the pipe 11. In this position, the end of the coupling member 12 may easily be inserted in the receptacle of the second coupling member 13. The sliding or telescoping movement of the thick wall shaft 14 is hand implemented, or is pulled with a clamping tool with hoop pressure sufficient to grip and activate its axial movement.

The second coupling member is of tubular configuration including a shaft 20 having an internal undercut receptacle 22 formed in the distal end thereof. The second coupling member is preferably formed of a suitable polymeric material such as polyvinyl chloride or the like. An axial bore extends through the second coupling member 13 and the bore terminates in a repository recess or receptacle 22 sized to receive the head 16 of the first coupling member 12.

The deformable nature of the head 16 of the first coupling member 12 permits limited axial shifting of the shaft 14 along the pipe 11. The wall of the head 16 is substantially thinner than the wall of the shaft 14 so that upon relative shifting, the head 16, rather than the shaft 14, elongates and shrinks. The head 16 is illustrated in its collapsed configuration in FIG. 4 to enable stabbing into the female fitting. The retraction radially inwardly contacts the surface of the pipe 11. The head 16 is thus expandable to an enlarged locking configuration as illustrated in FIG. 3 (the head 16 is bulbous); the maximum head diameter is substantially greater than the diameter of the pipe 11 to lock into the female coupling.

In operation, the first coupling member 12 is ready for insertion or removal from the receptacle 22 upon deforming the head 16 to its collapsed configuration by relatively shifting the shaft 14 axially along the pipe 11 to the position illustrated in FIG. 4. The surrounding shaft 14 thus has two positions differing by a distance enabling diametrical expansion. This shrinks the maximum diameter of the head 16 and thus facilitates either insertion or removal of the head 16 from the receptacle 22 of the second coupling member 12.

With the head 16 in its collapsed configuration, the first coupling member 12 is inserted into the cavity 22 until the head 16 lies inside the interior of the receptacle 22. While holding the pipe 11 relatively stationary, the shaft 14 is shifted axially leftwardly as viewed in the various figures to its first position (see FIG. 3) wherein the head 16 expands within the receptacle 22 of the second coupling member 13 as best shown in FIG. 2.

The shifting of shaft 14 (contrast FIG. 3 to FIG. 4) permits the head 16 to enlarge to its prior size and configuration within the receptacle 22 into a leak proof peripheral seal therewith. The head 16 is sufficiently yieldable so as to deform between the collapsed and locking configuration as desired, yet it is also sufficiently rigid in nature so as to hold its shape in opposition to the normal stresses of locked arrangement. This self holding property of the head 16 assures that unwanted relative shifting or release of the first and second coupling members is resisted. Positively holding the two coupling members together persists until the shaft 14 is again deliberately axially telescoped along the pipe 11 to collapse the head 16 for release.

When it is desired to uncouple the pipe 11, the shaft 14 of the first coupling member 12 is shifted axially (see FIG. 3 and FIG. 4) to thereby pull and reduce, without fail, the head 16 to its collapsed configuration of FIG. 4 for release. Accordingly, the first coupling member 12 is then removed from the receptacle 22 of the second coupling member 13 as easily as it was inserted. Since head 16 is not permanently sealed within the receptacle 22, adequate forces resisting accidental shifting of the shaft 14 is that force required to deform the head 16 to its collapsed configuration and the friction encountered on sliding along the pipe 11.

The shaft 14 telescopes without rotation. Rotation is prevented by an elongate key and key slot shown in FIG. 5. The tip of the thin wall head 16 is shown in FIG. 6 attached to the end of the pipe 11. A mating notch and matching tab 32 align those parts in FIG. 6; a contact solvent or adhesive assists in joining the parts together so the end of the head is fixed against accidental release.

The foregoing is directed to the preferred embodiment but the scope is determined by the claims which follow

What is claimed is:

1. A pipe coupling device comprising:
   (a) a first tubular coupling member mounted about an end of a first pipe, said first tubular coupling member having an axial passage extending therethrough and including a centered longitudinal axis, one end of said first tubular coupling member including a circumferential lip defining the leading edge of said passage, said circumferential lip extending inwardly toward said longitudinal axis forming a shoulder for engaging the end of said first pipe extending in said passage, the other end of said first tubular coupling member being defined by a cylindrical shaft portion adapted to slidably receive said first pipe therethrough;
   (b) means for securing said one end of said first tubular coupling member to the end of said first pipe engaging said circumferential lip;
   (c) said first tubular coupling member including an enlarged resilient head extending from said lip to said shaft portion, said head being shaped to independently and automatically assume an enlarged and predetermined shape defining an enlarged locking configuration;
   (d) a second tubular coupling member mounted about an end of a second pipe, said second tubular coupling member having an axial passage extending therethrough, one end of said second tubular coupling member being defined by an internal recess having an end wall of a diameter smaller than the maximum diameter of said enlarged head and sized to receive said enlarged head of said first coupling member for sealing engagement therewith;
   (e) said head being deformable from said predetermined shape to a collapsed shape to enable insertion of said head into said recess of said second tubular coupling member; and
   (f) said head respectively deforming to said collapsed shape in response to relative shifting of said first tubular coupling member along the first pipe between first and second positions, said head expanding within said recess upon return to said first position forming a sealing profile substantially corresponding to said recess and thereby joining said first pipe and said second pipe, and preventing relative movement between said first and second tubular coupling members and forming a peripheral locking seal therewith.

2. The apparatus of claim 1 including key means supported on the first pipe cooperative with key slot means in said shaft portion of said first tubular coupling member to enable controlled telescoping thereof while preventing rotation of said first tubular coupling member relative to said first pipe.

3. The apparatus of claim 2 or 1 including notch means formed on the end of said first pipe cooperative with tab means formed on said first tubular coupling member for joining said enlarged head at a fixed location to said first pipe for mounting thereon.

* * * * *